United States Patent

[11] 3,630,100

[72] Inventor Henry Lemak
Huntington Woods, Mich.
[21] Appl. No. 53,860
[22] Filed July 10, 1970
[45] Patented Dec. 28, 1971
[73] Assignee General Motors Corporation
Detroit, Mich.

[54] VEHICLE PEDAL
3 Claims, 4 Drawing Figs.
[52] U.S. Cl. .................................................. 74/562
[51] Int. Cl. ....................................... G05g 11/16
[50] Field of Search ............................................ 74/512, 562, 560, 97, 519

[56] References Cited
UNITED STATES PATENTS
2,915,916 12/1959 Hinsey et al. .................. 74/512 X
3,051,015 8/1962 Hinsey ........................... 74/512 X Primary Examiner—William F. O'Dea
Assistant Examiner—F. D. Shoemaker
Attorneys—W. E. Finken and D. L. Ellis ABSTRACT: A dual-position vehicle pedal including a primary pedal pivotally mounted on the vehicle body and connected to a vehicle-operating system for actuation thereof in response to pressure on a primary bearing surface of the primary pedal and further including a secondary pedal pivotally mounted on the primary pedal for movement between an extended position wherein a secondary bearing surface thereon overlies the primary bearing surface to thereby extend the reach of the primary pedal and a normal retracted position exposing the primary bearing surface.

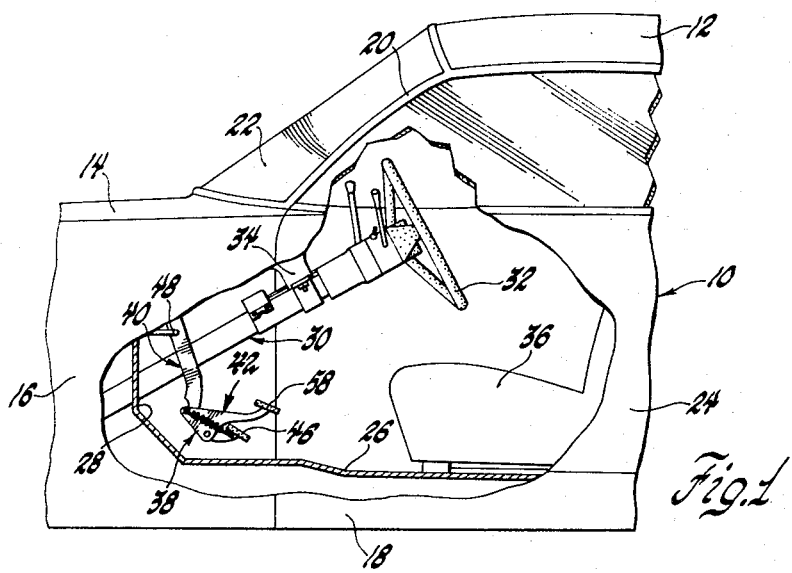

VEHICLE PEDAL

This invention relates to vehicle pedals and in particular to a dual-position pedal having a normal and an extended reach.

A recent proposal in the design of automotive vehicles suggests that the vehicle front seat structure, normally adjustable relative to the vehicle body, be rigidly fastened to the vehicle body and incorporated into the occupant restraint system. While attractive in many respects, such a system requires that the vehicle controls be made adjustable relative to the rigid seat structure to accommodate both large and small operators. In particular, means must be provided to vary the distance between the conventional clutch and brake pedal bearing surfaces and the front seat structure to insure comfortable operation thereof by different size operators. A vehicle pedal according to this invention presents a pedal bearing surface at a normal distance from the front seat structure which is comfortably operably by operators of average or greater than average size, the pedal being easily and simply converted into one presenting a bearing surface substantially nearer the front seat structure so as to be comfortable operable by small operators.

The primary feature of this invention is that it provides a new and improved primary vehicle pedal including means supporting a secondary bearing surface thereon for movement from a remote position to a position generally overlying the bearing surface of the primary pedal thereby to increase the reach of the primary pedal. Another feature of this invention resides in the provision of a secondary pedal rigidly supporting the secondary bearing surface, the secondary pedal being pivotally mounted on the primary pedal and having stop means thereon cooperable with stop means on the primary pedal to limit movement of the secondary pedal to extended and retracted positions. A still further feature of this invention resides in the provision of spring means urging the secondary pedal alternatively into respective ones of the extended and the retracted positions.

These and other features of this invention will be readily apparent from the following specification and from the drawings wherein:

FIG. 1 is a fragmentary partially broken away side elevational view of an automobile-type vehicle body having a dual position pedal according to this invention;

FIG. 2 is an enlarged view of a portion of FIG. 1 and showing the secondary pedal in extended and retracted positions, respectively, in solid and broken lines;

FIG. 3 is a sectional view taken generally along the plane indicated by line 3—3 in FIG. 2; and FIG. 4 is a perspective view of the primary and secondary pedals.

Referring now to FIG. 1 of the drawings, an automobile type vehicle body 10 includes a roof structure 12, a hood 14, a left front fender structure 16 and a conventional rocker panel structure 18 extending rearwardly from the front fender structure. The forward portion of the roof structure is supported by a pair of body pillars, only left body pillar 20 being shown in FIG. 1, and a front windshield 22 is sealingly retained with a frame defined generally by the roof structure, the hood and the body pillars. The front fender structure and the rocker panel structure cooperates with a left quarter panel structure of the vehicle body, not shown, to define a conventional door opening in which a door 24 is vertically hinged at its forward edge for movement between an open position, not shown, and a closed position, FIG. 1.

The door structure 24 in the open position thereof permits movement to and from the interior portion of the vehicle body, the lower portion of the latter being defined by a rigid floor structure 26 and the forward portion thereof being defined by a generally vertical toeplate 28 integral with the floor structure. A steering column assembly 30 having a steering wheel 32 mounted on the end thereof is suspended within the vehicle body interior by a bracket 34. A vehicle seat structure 36 is rigidly fastened to the floor structure 26 generally below and rearwardly of the steering wheel 32. The rigid vehicle seat structure may be of the bench or bucket type, either of which can be readily incorporated into the vehicle occupant restraint system, not shown. The steering column assembly, of course, embodies means, not shown, for adjusting the position of the steering wheel 32 longitudinally and vertically. For a more detailed description of such steering wheel adjustment means reference may be made to Cantleberry U.S. Pat. No. 3,342,080, issued Sept. 19, 1967, and assigned to the assignee of this invention. Assuming the vehicle illustrated to be one equipped with a conventional automatic transmission, only a single dual-position pedal according to this invention and generally designated 38 is provided on the vehicle body for foot actuation of the vehicle brake system. It will, of course, be apparent that a vehicle equipped with a manual transmission would require, in addition to brake-actuating dual-position pedal 38, a clutch actuator which might also be a dual-position pedal according to this invention.

As best seen in FIGS. 2 and 4, the dual-position pedal 38 includes a primary pedal 40 and a secondary pedal 42. The primary pedal includes an elongated generally flat lever arm or shank 44 having a pad or primary bearing surface 46 rigidly mounted on one end thereof. A draft link 48 has one end thereof pivotally connected to the shank 44 intermediate the ends of the latter and is connected at the other end to the vehicle brake master cylinder, not shown. A bracket 50 is rigidly secured to the vehicle body and carries a pivot shaft 52 which rotatably supports the distal end of the shank 44 of the primary pedal. The primary pedal is rotatable clockwise, FIG. 2, from an inoperative position to an operative position, shown respectively in solid and broken lines in FIG. 2, during which movement the brake master cylinder is actuated by draft link 48, thereby energizing the brakes to bring the vehicle to a stop.

Referring particularly now to FIGS. 2 nd 3, the secondary pedal 42 includes a generally U-shaped or bifurcated shank having sides 54 and an interconnecting web 56, the shank having a pad or secondary bearing surface 58 rigidly mounted on one end thereof. A pivot shaft 60 rigidly supported on the shank 44 of the primary pedal defines an axis of the latter and is rotatably received within a pair of axially aligned apertures in respective ones of the sides 54 of the shank of the secondary pedal thereby supporting the secondary pedal on the primary pedal in straddling and generally coplanar relation thereto, FIG. 3, and for pivotal movement relative thereto.

As best seen in FIG. 3, first stop means are provided to limit pivotal movement of the secondary pedal in the clockwise direction. FIG. 2, and include a pin 62 supported by the sides 54 of the secondary pedal shank generally at the distal end of the latter, the pin 62 projecting generally perpendicularly to the planes of sides 54 of the secondary pedal shank. Interference between the pin 62 and the rear edge of the primary pedal shank 44 functions to limit clockwise pivotal movement of the secondary pedal relative to the primary pedal to an extended position, FIG. 2, wherein the secondary bearing surface 58 generally overlies the primary bearing surface 46 in spaced relation thereto. In the counterclockwise direction, FIG. 2, pivotal movement of the secondary pedal relative to the primary pedal is limited by interference between an edge of secondary bearing surface 58 and the forward edge of primary pedal shank 44, the interference defining a retracted position of the secondary pedal as shown in broken lines in FIG. 2.

As seen best in FIGS. 2 and 3, a coil tension spring 64 has a first end anchored in an aperture 66 in the primary pedal shank 44 and a second end anchored on the pin 62 at 68. In the extended position of the secondary pedal 42 the spring 64 is situated above the pivot shaft 60 and functions to urge the secondary pedal in a clockwise direction thereby to maintain the latter in the extended position. In the retracted position of the secondary pedal 42 the spring 64 is situated below the pivot shaft 60 and urges the secondary pedal in a counterclockwise direction thereby maintaining the latter in the retracted position.

Normally, the secondary pedal 42 assumes the retracted position exposing the primary bearing surface 46. An operator of average or above average size seated on the seat structure 36 behind the steering wheel 32 can comfortably reach the primary bearing surface for conventional foot actuation of the vehicle brake system. When it is desired to apply the vehicle brakes, the operator merely applies foot pressure to the primary bearing surface, thereby rotating the primary pedal from the inoperative to the operative position to actuate the brake master cylinder as described hereinbefore. When foot pressure is removed from the primary bearing surface 46 the normal resilience of the vehicle brake system functions through draft link 48 to return the primary pedal from the operative to the inoperative position.

A small operator who might normally have difficulty reaching the primary bearing surface of the primary pedal can comfortably actuate the vehicle brake system by means of the secondary pedal. More particularly, to bring the secondary pedal from the retracted to the extended position, the operator merely hooks a portion of the secondary pedal with a foot to initiate clockwise pivotal movement, FIG. 2, relative to the primary pedal. Spring 64 initially resists such movement until the secondary pedal achieves a position wherein the spring 64 moves over center relative to the pivot shaft 60 whereupon the spring 64 rotates the secondary pedal the remainder of the way to the extended position. As best seen in FIGS. 1 and 4, the secondary pedal in the extended position thereof supports the secondary bearing surface 58 in a position aligned with the primary bearing surface 46 and at a predetermined distance from the seat structure 36 which can be easily traversed by the leg of the small operator.

In the extended position of the secondary pedal, the small operator merely applies foot pressure on the secondary bearing surface to actuate the vehicle brake system. Since the secondary bearing surface 58 is offset from pivot shaft 60, pressure applied to the former generates both a compressive force on the pivot shaft 60 and a clockwise turning moment thereabout, FIG. 2. The turning moment is resisted at the opposite end of the secondary pedal shank by the pin 62 abutting the edge of primary pedal shank 44. The compressive force thus remaining on the pivot shaft 60 functions to rotate the primary pedal 40 clockwise, FIG. 2, from the inoperative to the operative position thereby actuating the brake master cylinder. Foot pressure, of course, can be applied at any location on the secondary bearing surface, the lateral stability of the secondary pedal 42 being maintained by the straddling engagement between the primary pedal shank 44 and the sides 54 of the secondary pedal shank. To return the secondary pedal to the retracted position thereof, the operator merely hooks a portion of the secondary pedal with a foot to initiate pivotal movement of the secondary pedal relative to the primary pedal to a position wherein the spring 64 moves back over center relative to the pivot shaft 60 whereupon the secondary pedal is rotated the remaining distance to the retracted position by the spring 64.

Having thus described the invention what is claimed is:

1. In a vehicle body having a primary pedal mounted thereon for movement between an inoperative position and an operative position actuating an operating system of said vehicle body in response to pressure applied to a primary bearing surface of said primary pedal, the improvement comprising a secondary pedal having a secondary bearing surface thereon, means mounting said secondary pedal on said primary pedal in generally coplanar relation thereto and for pivotal movement about an axis of said primary pedal, first stop means on said primary and said secondary pedals engageable upon pivotal movement of the latter relative to the former in one direction to define an extended position of said secondary pedal wherein said secondary bearing surface thereon overlies said primary bearing surface in spaced relation thereto, said first stop means and said mounting means in said extended position of said secondary pedal transmitting pressure applied on said secondary bearing surface to said primary pedal thereby to move the latter from said inoperative to said operative position, second stop means on said primary and said secondary pedals engageable upon pivotal movement of the latter relative to the former in the other direction to define a retracted position of said secondary pedal wherein said secondary bearing surface thereon is removed from overlying relation to said primary bearing surface, and means releasably retaining said secondary pedal in either one of said extended and said retracted positions.

2. The improvement as recited in claim 1 wherein said means releasably retaining said secondary pedal is a tension spring connected at first end to said primary pedal and at a second end to said secondary pedal, said tension spring biasing said secondary pedal selectively and alternately toward respective ones of said extended and said retracted positions.

3. In a vehicle body, a dual position pedal comprising a primary pedal having an elongated shank with a primary bearing surface at one end thereof, means pivotally connecting the other end of said shank to said vehicle body thereby to mount said primary pedal on said vehicle body for movement in response to pressure applied on said primary bearing surface between an inoperative position and an operative position actuating an operating system of said vehicle body, a secondary pedal having an elongated shank with a secondary bearing surface on one end thereof, means mounting said secondary pedal shank on said primary pedal shank in generally coplanar relation thereto and for pivotal movement about a pivot axis defined by said primary pedal shank and intersecting said secondary pedal shank intermediate the ends thereof, pin means rigidly mounted on the other end of said secondary pedal shank and rotatable as a unit therewith about said pivot axis, said pin means engaging said primary pedal shank upon pivotal movement of said secondary pedal relative to said primary pedal in one direction thereby to define an extended position of said secondary pedal wherein said secondary bearing surface overlies said primary bearing surface in spaced relation thereto, said means pivotally connecting said primary and said secondary pedals and said pin means in said extended position of said secondary pedal transmitting pressure applied on said secondary bearing surface to said primary pedal thereby to move the latter from said inoperative to said operative position, a tension spring connected at one end to said primary pedal shank and at the other end to said secondary pedal shank generally adjacent said rigid pin means thereon, said spring in said extended position of said secondary pedal being situated on one side of said pivot axis and resiliently maintaining said secondary pedal in said extended position, and stop means on said primary and on said secondary pedals engageable upon pivotal movement of said secondary pedal relative to said primary pedal in the other direction to define a retracted position of said secondary pedal wherein said secondary bearing surface thereon is removed from overlying relation to said primary bearing surface, said spring in said retracted position of said secondary pedal being situated on the other side of said pivot axis and resiliently maintaining said secondary pedal in said retracted position.

* * * * *